(No Model.) 4 Sheets—Sheet 1.
F. M. EVERINGHAM.
CULTIVATOR.
No. 316,886. Patented Apr. 28, 1885.
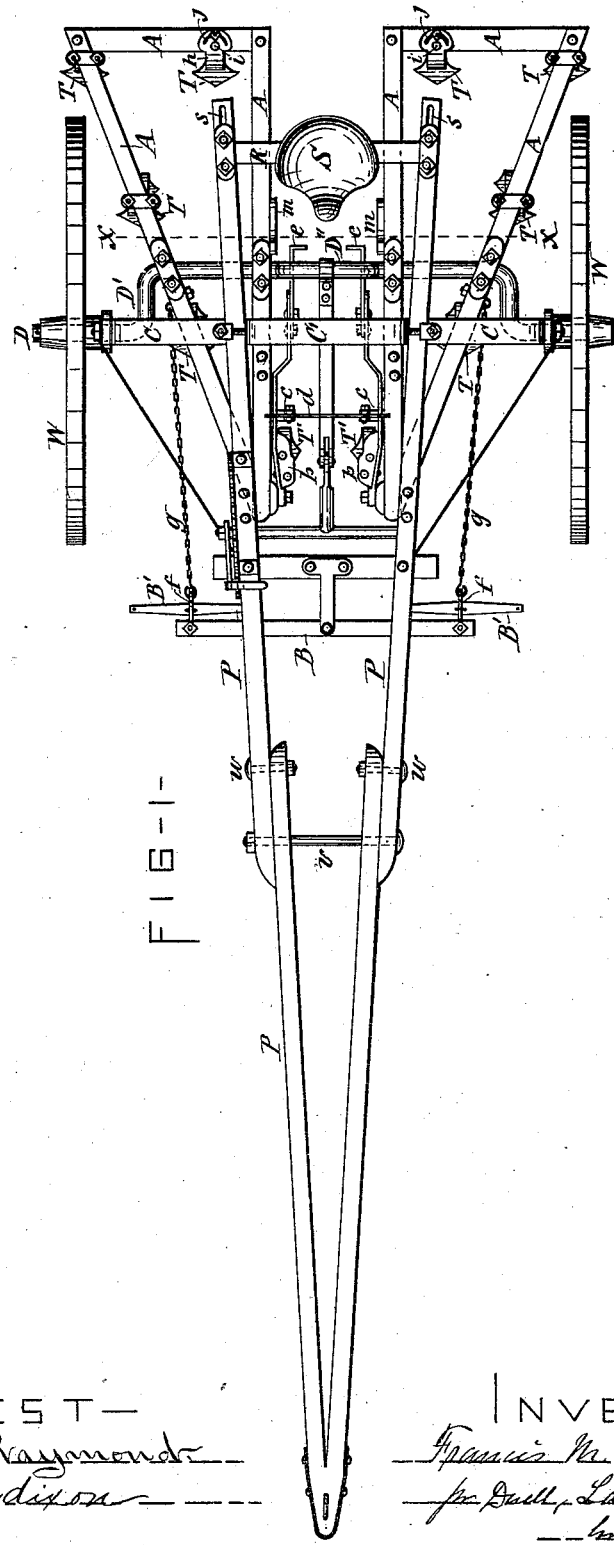
FIG-1-
ATTEST— INVENTOR—

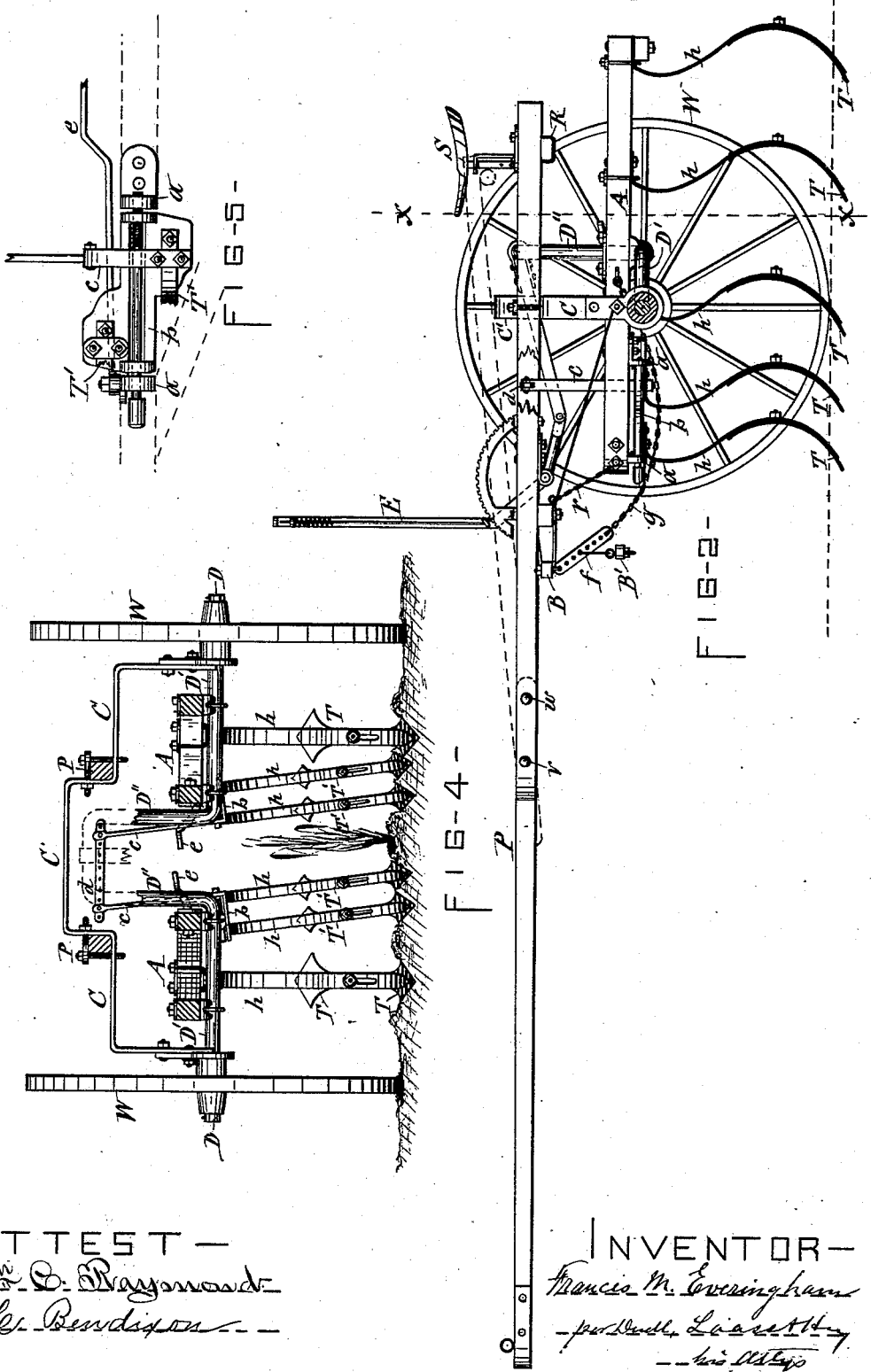

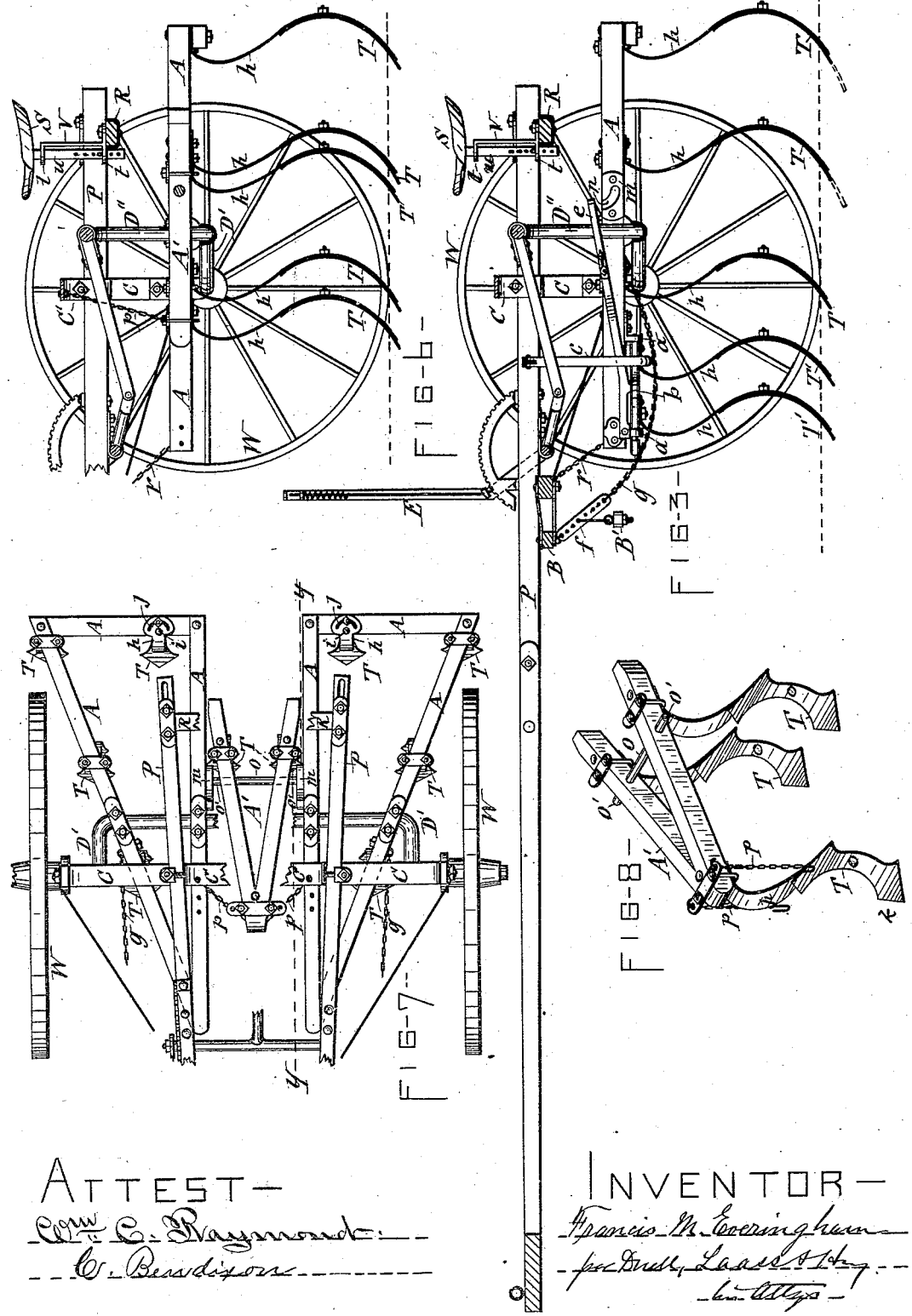

(No Model.)  4 Sheets—Sheet 4.
F. M. EVERINGHAM.
CULTIVATOR.
No. 316,886.  Patented Apr. 28, 1885.
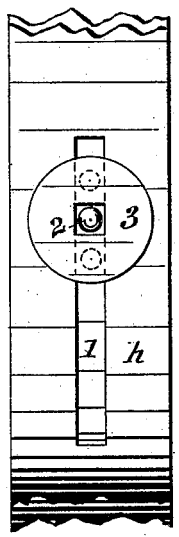
FIG-9-
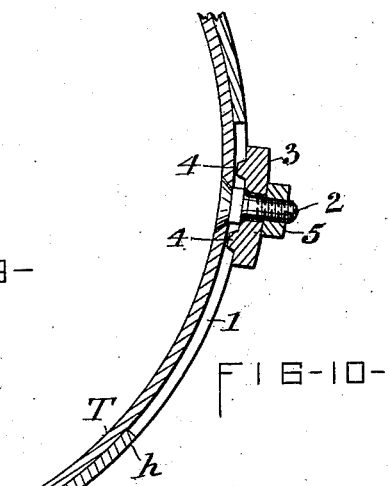
FIG-10-
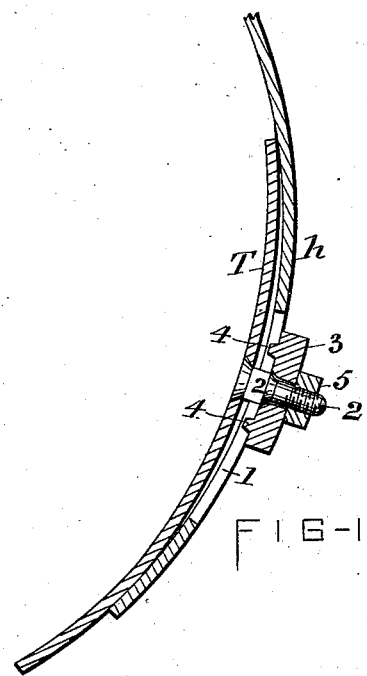
FIG-11-
FIG-12-
ATTEST—
Geo. E. Raymond
C. B. Dixon
INVENTOR—
Francis M. Everingham
per Dudly, Lee & Stay
his Attys

UNITED STATES PATENT OFFICE.

FRANCIS M. EVERINGHAM, OF EAST ONONDAGA, NEW YORK.

CULTIVATOR.

SPECIFICATION forming part of Letters Patent No. 316,886, dated April 28, 1885.

Application filed October 16, 1884. (No model.)

*To all whom it may concern:*

Be it known that I, FRANCIS M. EVERINGHAM, of East Onondaga, in the county of Onondaga, in the State of New York, have invented new and useful Improvements in Cultivators, of which the following, taken in connection with the accompanying drawings, is a full, clear, and exact description.

This invention relates to the class of cultivators in which the central or innermost teeth are arranged movable laterally and controlled in their position by treadles or levers operated by the attendant of the machine, so that said attendant can guide said teeth independently of the frame to safely operate close to plants standing out of the line of the regular row; and the invention has more particularly reference to the cultivator for which I have obtained Letters Patent No. 301,812, dated July 8, 1884.

In the operation of the class of cultivators above referred to it is found that when swinging the central teeth to one side to cultivate the soil at the sides of the plant standing out of line with the regular row, the space between the side teeth and the outer teeth at one side of the cultivator is so enlarged as to leave a strip of land uncultivated; hence the operation of said cultivator is incomplete. Although this defect has been to some extent overcome by oscillating the entire gang of teeth, yet such an arrangement has other serious defects—viz., a lateral deflection of all the teeth throws the strain towards one side of the line of draft, and thus produces a torsional strain on the machine and extra strain on the horses; it also increases the labor of the attendant of the machine by the increased weight of the teeth to be shifted, and, furthermore, it deprives the machine of a great portion of its efficiency, inasmuch as it is an established fact that the cultivator-tooth works best when in a vertical position.

My present invention is designed to obviate all of the aforesaid defects; and to that end it consists in an improved construction and arrangement of secondary or auxiliary laterally-movable teeth in conjunction with the usual central laterally-movable teeth and the sets of stationary teeth at the outer side of the machine, all as hereinafter more fully described, and specifically pointed out in the claims.

The invention is fully illustrated in the annexed drawings, wherein Figure 1 is a plan view of my improved cultivator. Fig. 2 is a side elevation of the same, taken immediately back of the near carrying-wheel. Fig. 3 is a vertical longitudinal section taken through the center of the machine. Fig. 4 is a vertical transverse section on line $xx$, Fig. 2. Fig. 5 is an enlarged inverted plan view of the devices by which the oscillating central teeth are connected to the frame. Fig. 6 is a vertical longitudinal section on line $yy$, Fig. 7. Fig. 7 is a plan view of the frames of the cultivator, with the superstructed parts broken away to better illustrate the arrangement of the removable central frame-section with the two side frame-sections. Fig. 8 is a detached isometric view of the central frame-section. Fig. 9 is an enlarged rear view of that portion of the spring-shank to which the tooth is attached, the nut being removed to show the form of the attaching-bolt. Fig. 10 is a longitudinal section of the same with the nut applied. Fig. 11 illustrates the effect of the aforesaid attachment, and Fig 12 illustrates the effect of the adjustability of the tooth obtained by the aforesaid attachment.

Similar letters of reference indicate corresponding parts.

D represents the carrying-axle of the machine, and W W the carrying-wheels loosely connected to the ends of said axle in the ordinary and well known manner.

On the axle D, immediately back of the wheels W W, is a yoke, C, which rises above the frames A A, and is formed with a still further raised right-angled central portion, C', against the vertical portions of which the convergent arms of which the pole P is formed are clamped, as shown. The axle D is cranked at the inner side of the vertical arms of the yoke C, twice at right angles, so as to form two arms, D' D', which are in line with each other and stand eccentric in relation to the wheel-hubs. The central portion, D'', of the axle is formed with two more right angled bends or cranks, producing a farther deflection of the axle. This cranked central portion, D'', of the axle is connected with the usual lever, E, by means of which the axle can be turned so as to carry the arms D' D' at a greater or less elevation from the ground—said arrangement being so common to cultivators and other agricultural machines that it is deemed unnecessary to here describe it in detail.

On the arms or axle-sections D' D' are mounted the two frame-sections A A, the forward ends of which are connected with the superstructed pole P, or cross-bar thereof by chains r r, as shown in Figs. 2 and 3 of the drawings.

To the frame-sections A A, at the extreme distance from the center of the line of draft, are firmly attached spring cultivator-teeth, consisting of spring-shanks formed of flat steel bars curved reverse or S shape endwise, and the teeth T properly formed of flat bars curved endwise to correspond to the curvature of the free ends of the shanks h, to which they are detachably secured in the following manner, viz: The lower portion of the shank h, to which the tooth is to be attached, is provided with a vertical slot, 1, and through the tooth and the said slot is extended the attaching-bolt 2, the head of which is countersunk in the front face of the tooth. That portion of the bolt which is in the slot 1 is squared so as to prevent the bolt from turning. Onto the bolt is slipped a washer, 3, formed with lugs, 4 4, which enter the slot 1 above and below the bolt and thus prevent the washer from turning, and a nut, 5, is applied to the end of the bolt. The tooth normally has a curvature of a greater radius than that of the curvature of the shank, and hence when placed against the shank a space is left back of the center of the tooth while the ends thereof rest against the shank h, as represented in Fig. 11 of the drawings. By tightening the nut 5 the aforesaid parts are drawn closely together, as shown in Fig. 10 of the drawings, and the tooth is thus firmly secured in its position. The object of the slot 1 is to allow the tooth to be raised or lowered on the shank. By said adjustment the teeth nearest the row of plants can be set at a proper elevation to avoid injury to the roots of the plants, while the other teeth can be set lower to enter the ground the requisite depth to properly cultivate the same between the rows of plants, as illustrated in Fig. 12 of the drawings. By raising and lowering the teeth, as aforesaid, the pitch thereof can also be varied as may be desired, said feature being illustrated by dotted lines in Fig. 3 of the drawings. The teeth T and T', I form of a stiff plate with flaring points k k, and with a narrowed portion, l, between said points. The two points k k being of different dimensions adapt the tooth for different kinds of work by reversing it end for end, and the narrowing of the tooth above the point k allows the turned-up soil to run over the top of the flaring portions of the point, thus producing a narrower furrow compared to the depth of the soil turned up by the point, and also obviating, to a great extent, the clogging of the point by accumulation of weeds in front thereof, and, furthermore, a tooth constructed of the form aforesaid presents less resistance in its passage through the ground than the ordinary cultivator-tooth, and hence reduces the strain on the machine and on the horses drawing the same, and lightens the draft.

I am aware that prior to my present invention cultivator-teeth had been formed with broadened points at opposite ends, one of which ends extended to the cultivator-beam and was attached to a stiff short arm; but inasmuch as the main portion of said teeth was necessarily of great length and unsupported by the aforesaid arm, it became necessary to reenforce such teeth by a longitudinal rib formed thereon, which construction is very expensive. Furthermore, the main portion of the tooth, owing to the strain it is subjected to, could not be narrowed sufficiently to accomplish the object of my invention. By the combination of the peculiar shaped tooth with the spring-shank applied to the back of the tooth proper, the latter is braced, and thus the width of the main portion thereof, and the entire length of the tooth can be reduced.

The shank h of the tooth T, I form with a broad upper end provided with an eye, i, and segmental slot j, as shown in Fig. 7 of the drawings. A bolt passing through the eye and into the frame serves as a pivot on which the shank h can be turned to hold the tooth T at different angles as may be desired, and by means of another bolt passing through the slot j and into the frame the aforesaid shank can be fastened in its position.

T' T' represent laterally-movable cultivator-teeth arranged between the stationary outer teeth, T, and in two sets of two or more teeth each. Said sets of teeth are supported from the two frame-sections A A, respectively, at opposite sides of the center of the line of draft, and are arranged to swing or move laterally conjointly and independently of the frame-sections by the following instrumentalities.

To the under side of each frame-section A are attached two hangers, a a, between which is pivoted a plate, b, by means of a rod passing through the hangers and through ears on the ends of said plate, as shown in Fig. 5 of the drawings. At opposite sides of the aforesaid pivoting-rod the plate b is provided with lateral extensions, to which are attached two or more teeth, T' T', the two sets of oscillating teeth being designed to cultivate the soil between the row of plants and the outer teeth, T T.

To the plate b is rigidly attached a vertical arm, c, which projects above the frame A, and is movably and adjustably connected with the arm c of the other plate, b, connected with the frame-section A at the opposite side of the center of the line of draft. The coupling of the two arms c c consists of a bar, d, having a series of holes at different points of its length, and passing through slots in the ends of the arms c c, which latter are perforated for the reception of coupling-pins, each of which passes through one of the series of holes in the bar d, as shown in Figs. 1 and 4 of the drawings.

It will be observed that by the described attachment of the oscillating teeth T' T', and the connection of the two sets of said teeth, all of the oscillating teeth are compelled to move conjointly. They are controlled in their said movement by means of treadles or levers $e\ e$, pivoted on the forward hangers, $a\ a$, and extended rearward therefrom and resting on the plates $b\ b$, said treadles being operated by the feet of the driver sitting on the seat S, near the rear end of the machine.

In order to render the treadles adjustable in length, and convenient to the driver, I form the said treadles of two sections, spliced end to end and lapping over each other, one of said sections having a longitudinal slot through which the connecting-bolts pass, as shown in Fig. 3 of the drawings, said slot allowing the end sections to be shifted so as to project a greater or less distance from the other section.

The seat S is mounted on a cross-bar, R, attached to a rearward extension of the pole P, thus causing the weight of the driver to nearly or quite counterbalance the front end of the pole, and relieving the horses of the weight of the neck-yoke. This counterbalancing of the pole I make adjustable by providing the pole with longitudinal slots $s\ s$, for the reception of the bolts by which the cross-bar R is attached to the pole, as illustrated in Fig. 1 of the drawings, which slots allow the cross-bar, together with the seat S mounted thereon, to be moved back or forth as may be required by the variations of the weight of different drivers.

To accommodate the seat S to the treadles $e\ e$, I make the seat adjustable in its elevation by attaching to the cross-bar R a standard, V, provided with horizontal arms $t\ t$, as shown in Fig. 3 of the drawings. The seat S is provided with a rigid pendent shank, $u$, which passes through apertures in the arms $t\ t$, and is provided with a series of holes at different elevations, through one of which holes a pin is extended, and rests on one of the arms $t$. The seat can be raised or lowered on the standard V, and the supporting-pin shifted from hole to hole of the standard, according to the elevation of the seat desired.

The pole P is composed of two convergent bars, as hereinbefore mentioned; and in order to adapt said pole to be folded in a compact manner for storing the machine, I form the pole with a loose joint at or near the center of its length, said joint consisting in lapping the ends of the rear pole-section over that outside of the end of the forward section, and extending transversely through the overlapping portions of the pole a bolt, $v$, which serves as a pivot on which the forward pole-section can be swung vertically, and thus be folded back upon the rear pole-section, as represented by dotted lines in Fig. 2 of the drawings. The pole is sustained in its extended and operative position by means of bolts $w\ w$, passing transversely through the opposite end of the spliced portion of the pole, as shown in Fig. 1 of the drawings.

B' represents the whiffletrees, which are adjustably connected with the double-tree B, and with the two frame-sections A A, by means of metal straps $f\ f$, hung on the ends of the double-tree B, and provided at different points of their length with a series of holes for the attachment of the clevises or rings connected to the whiffletrees B' B'. Draft-chains $g\ g$ connect the free ends of the straps $f\ f$ with the respective frame-sections A A. By the described arrangement more or less of the draft of the horse can be transmitted direct to the frames A A, and the whiffletrees can be raised or lowered as may be deemed necessary.

A' represents another frame section, provided with spring-teeth T T, and adapted to be introduced between the frame-sections A A, said central section being designed to be used in lieu of the vibratory teeth T' T', when it is desired to convert the cultivator into a harrow. The central section, A', is provided with a cross-bar, $o$, which projects at opposite sides of said frame and forms trunnions $o'\ o'$, by which the frame A' is hung in slots $n\ n$, in plates $m\ m$, attached to the inner sides of the frame-sections A A. The forward end of the frame A' is connected with the yoke C by chains $p\ p$, as shown in Figs. 6 and 7 of the drawings.

When it is desired to convert the cultivator into a harrow by the addition of the central frame, A', with its teeth T T, as before described, the oscillatory teeth T' T' are to be removed.

I do not claim, broadly, the combination, with a cultivator-frame, of oscillatory teeth controlled at will of the operator, as I am aware the same is not new, but heretofore only one of said oscillatory teeth has been arranged at each side of the center of the line of draft, and the result was that when said teeth were swung to one side to operate close to a plant standing out of the regular row of plants, a wide uncultivated strip of land was left between the oscillatory teeth and the fixed tooth or teeth at one side of the machine. This defect is effectually obviated by arranging the set of two or more oscillatory teeth at each side of the center of the line of draft, as hereinbefore described.

What I claim as my invention is—

1. In a cultivator, the combination of the two innermost teeth arranged movable laterally independent of the frame, two sets of teeth arranged stationary, respectively, near the outer sides of the machine, secondary laterally-movable teeth between the primary movable teeth and the stationary teeth, couplings connecting together all the laterally-movable teeth, and levers for operating the same, all combined to operate close to plants standing out of the regular row without moving all the cultivator-teeth laterally, and without leaving uncultivated strips of land in the track of the cultivator, substantially as specified.

2. In a cultivator, the combination of the two innermost teeth arranged movable laterally independent of the frame, two sets of cultivator-teeth arranged stationary, respectively, near the outer sides of the machine, secondary laterally movable teeth arranged rearward from the innermost teeth, and between the same and the stationary outer teeth, couplings connecting all of the laterally-movable teeth together, and levers for operating the same, all combined to operate substantially in the manner specified and shown.

3. The combination, with the cultivator-frame, of the teeth T T, fixed to said frame at the extreme distances from the center of the line of draft, the hangers $a$ $a$, secured to the frame at opposite sides of the aforesaid center, the plates $b$ $b$, pivoted on the hangers, the teeth T' T', attached to the plates at opposite sides of the pivot thereof, arms $c$ $c$, extended from the pivoted plates, the coupling-bar $d$, connecting said arms, and the treadles or levers $e$ $e$, pivoted on the hangers and resting on the plates $b$ $b$, substantially as described and shown.

4. A stiff or rigid tooth formed with broadened points $k$ $k$, and narrowed central portion, $l$, in combination with a spring-shank having its end resting against the back of the narrow portion of the aforesaid tooth to sustain the same, substantially as described and shown.

In testimony whereof I have hereunto signed my name and affixed my seal in the presence of two attesting witnesses, at Syracuse, in the county of Onondaga, in the State of New York, this 7th day of October, 1884.

FRANCIS M. EVERINGHAM. [L. S.]

Witnesses:

FREDERICK H. GIBBS,
C. BENDIXON.